(12) United States Patent
Kamiyama et al.

(10) Patent No.: US 10,617,996 B2
(45) Date of Patent: Apr. 14, 2020

(54) DESULFURIZATION APPARATUS AND METHOD OF OPERATING DESULFURIZATION APPARATUS

(71) Applicant: MITSUBISHI HITACHI POWER SYSTEMS, LTD., Yokohama-shi, Kanagawa (JP)

(72) Inventors: Naoyuki Kamiyama, Tokyo (JP); Koichiro Hirayama, Tokyo (JP); Satoru Sugita, Kanagawa (JP); Yoshito Tanaka, Kanagawa (JP); Seiji Kagawa, Tokyo (JP); Toshihiro Fukuda, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 16/088,672

(22) PCT Filed: Feb. 21, 2017

(86) PCT No.: PCT/JP2017/006429
§ 371 (c)(1),
(2) Date: Sep. 26, 2018

(87) PCT Pub. No.: WO2017/169309
PCT Pub. Date: Oct. 5, 2017

(65) Prior Publication Data
US 2019/0105604 A1    Apr. 11, 2019

(30) Foreign Application Priority Data
Mar. 31, 2016    (JP) .................................. 2016-072508

(51) Int. Cl.
*B01D 53/50* (2006.01)
*B01D 53/78* (2006.01)
(Continued)

(52) U.S. Cl.
CPC ............. *B01D 53/50* (2013.01); *B01D 53/78* (2013.01); *C02F 1/008* (2013.01); *C02F 1/283* (2013.01);
(Continued)

(58) Field of Classification Search
CPC ............ B01D 53/1481; B01D 53/1493; B01D 53/343; B01D 53/40; B01D 53/50;
(Continued)

(56) References Cited

U.S. PATENT DOCUMENTS 4,687,649 A    8/1987    Kuroda et al.
5,762,763 A *  6/1998    Tsargorodski ......... B01D 3/007
                                                      202/166

(Continued)

FOREIGN PATENT DOCUMENTS

EP    2335806 A1 *    6/2011    ........... B01D 5/0012
JP    2-95493 A       4/1990
(Continued)

OTHER PUBLICATIONS

Translation of Written Opinion dated Mar. 21, 2017, issued in counterpart International Application No. PCT/JP2017/006429. (10 pages).

(Continued)

*Primary Examiner* — Timothy C Vanoy
(74) *Attorney, Agent, or Firm* — Westerman, Hattori, Daniels & Adrian, LLP

(57) ABSTRACT

A desulfurization apparatus includes a blowdown water line, an organic matter remover, an absorber, and a makeup water introducing line. The blowdown water line is for introducing boiler cooling tower blowdown water from a boiler cooling tower. The organic matter remover is disposed on the blowdown water line to remove organic matter in the boiler cooling tower blowdown water by activated carbon. The (Continued)

absorber is configured to absorb sulfur oxides in flue gas from a boiler. The makeup water introducing line is for introducing the boiler cooling tower blowdown water from which the organic matter has been removed as makeup water for the absorber.

8 Claims, 8 Drawing Sheets

(51) Int. Cl.
*C02F 1/28* (2006.01)
*C02F 1/42* (2006.01)
*C02F 1/00* (2006.01)
*F23J 15/02* (2006.01)
*F23J 15/00* (2006.01)
*C02F 103/18* (2006.01)
*C02F 1/44* (2006.01)
*C02F 101/30* (2006.01)
*C02F 103/02* (2006.01)

(52) U.S. Cl.
CPC .............. *C02F 1/42* (2013.01); *F23J 15/00* (2013.01); *F23J 15/02* (2013.01); *C02F 1/442* (2013.01); *C02F 1/444* (2013.01); *C02F 2101/30* (2013.01); *C02F 2103/023* (2013.01); *C02F 2103/18* (2013.01); *C02F 2201/005* (2013.01); *C02F 2209/03* (2013.01); *C02F 2209/04* (2013.01); *C02F 2209/08* (2013.01); *C02F 2301/043* (2013.01); *C02F 2301/08* (2013.01)

(58) Field of Classification Search
CPC ...... B01D 53/507; B01D 53/74; B01D 53/78; B01D 2252/103; B01D 2257/302; B01D 2257/80; B01D 2258/0283; B01J 10/00; B01J 19/00; B01J 2219/00; B01J 2219/00873
See application file for complete search history.

(56) References Cited

U.S. PATENT DOCUMENTS

| | | | |
|---|---|---|---|
| 8,518,148 B2* | 8/2013 | McDonald | B01D 53/501 95/229 |
| 2011/0067610 A1* | 3/2011 | Latimer | B01D 53/77 110/342 |
| 2013/0149206 A1 | 6/2013 | Ukai et al. | |
| 2014/0065046 A1* | 3/2014 | Stallmann | B01D 53/504 423/243.01 |

FOREIGN PATENT DOCUMENTS

| | | | |
|---|---|---|---|
| JP | 4-367506 A | 12/1992 | |
| JP | 2000-189964 A | 7/2000 | |
| JP | 2002-85941 A | 3/2002 | |
| JP | 2005-313034 A | 11/2005 | |
| JP | 2007-7580 A | 1/2007 | |
| JP | 2007-117783 A | 5/2007 | |
| JP | 2007-246695 A | 9/2007 | |
| JP | 2012-148246 A | 8/2012 | |
| JP | 2013-6144 A | 1/2013 | |
| JP | 2014-30777 A | 2/2014 | |
| JP | 2014-161844 A | 9/2014 | |
| JP | 2015-128754 A | 7/2015 | |
| JP | 2016-30243 A | 3/2016 | |
| WO | 2012/049774 A1 | 4/2012 | |
| WO | WO 2013 053235 A1 * | 4/2013 | ............ B01D 53/50 |

OTHER PUBLICATIONS

International Search Report dated Mar. 21, 2017, issued in counterpart International Application No. PCT/JP2017/006429. (3 pages).
Office Action dated Dec. 13, 2019, issued in counterpart IN application No. 201847035938, with English translation. (5 pages).

* cited by examiner

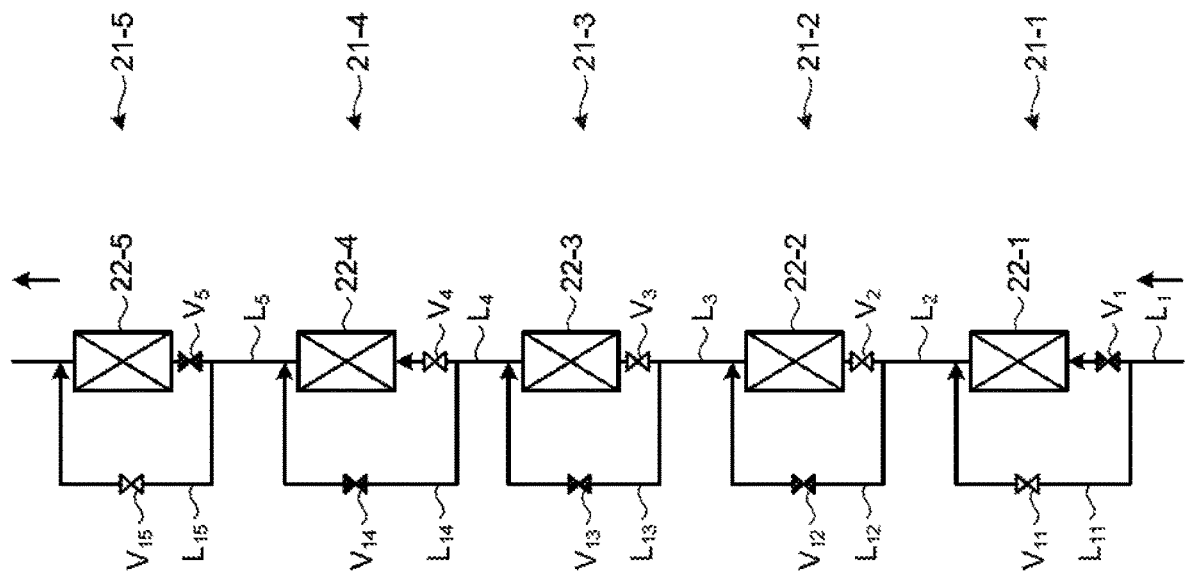
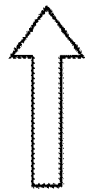
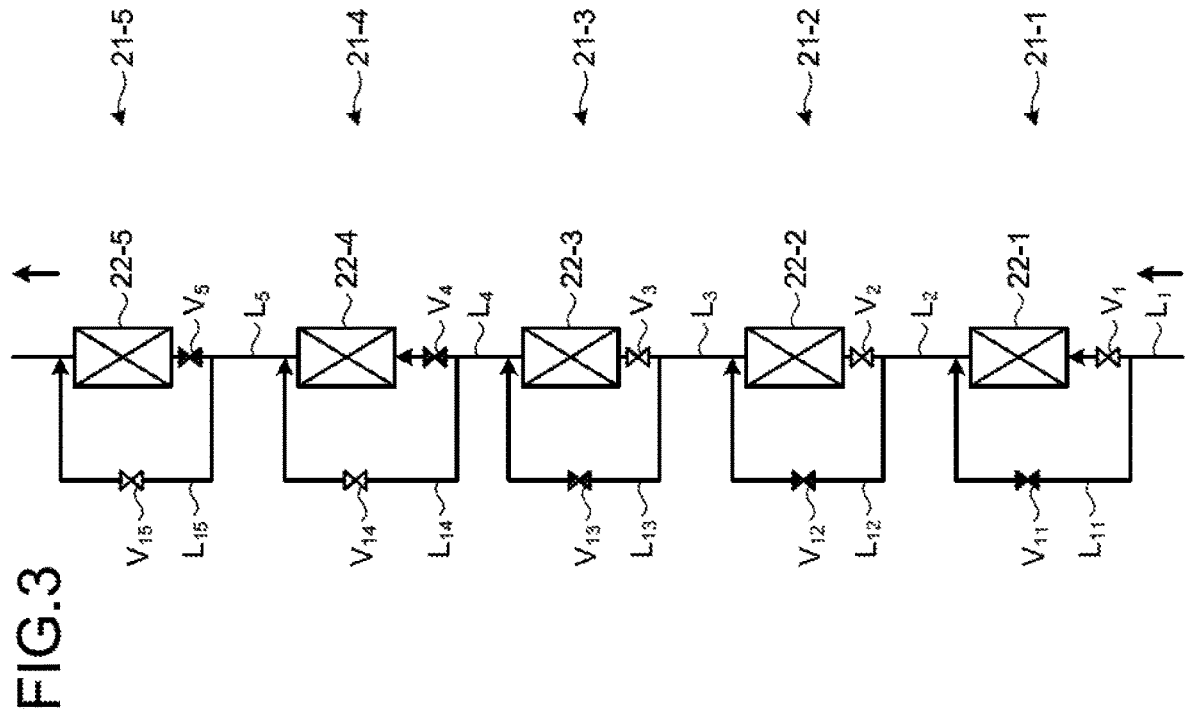
FIG.3

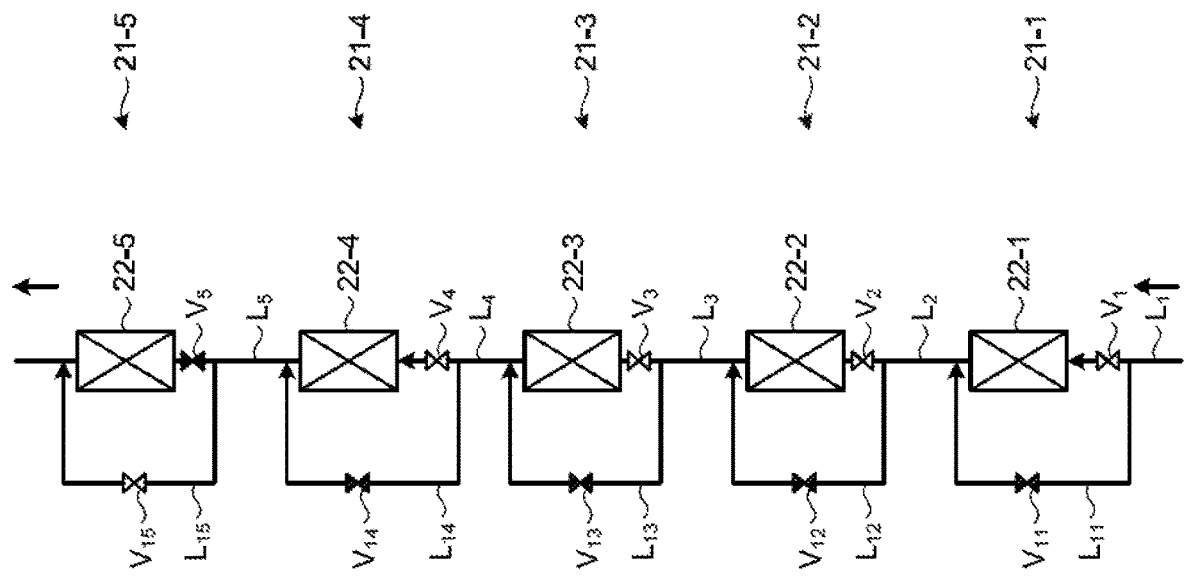
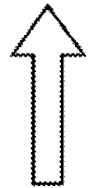
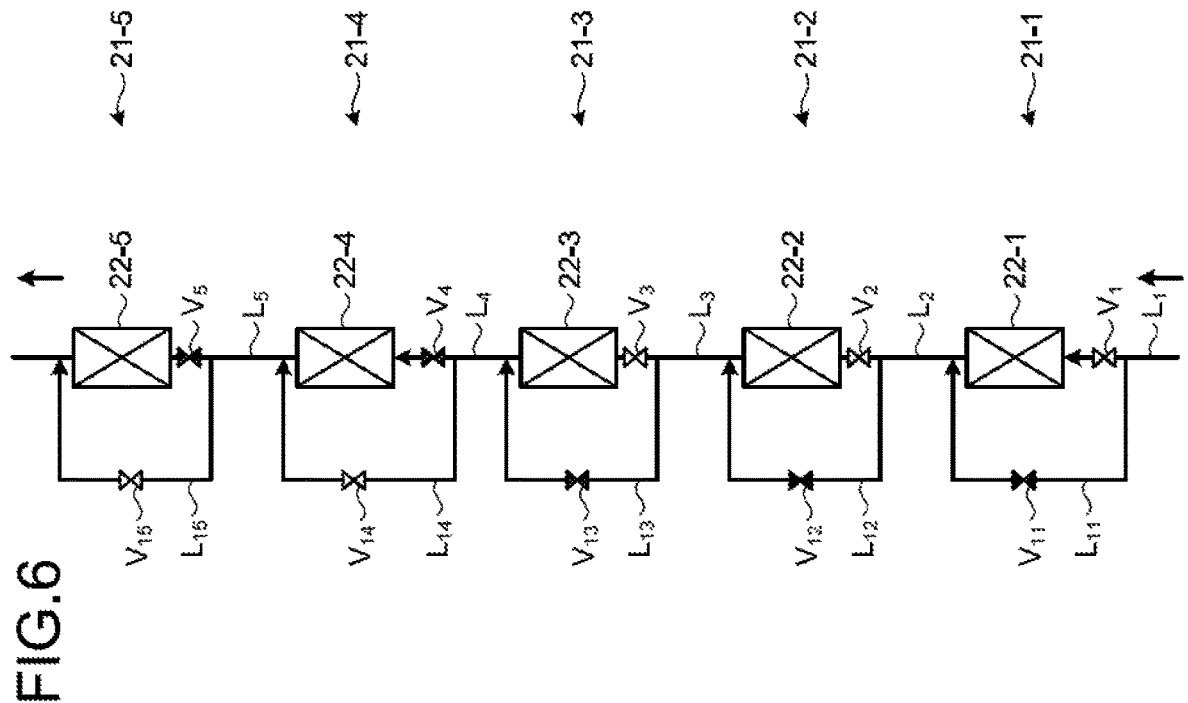
FIG.6

DESULFURIZATION APPARATUS AND METHOD OF OPERATING DESULFURIZATION APPARATUS

FIELD

The present invention relates to a desulfurization apparatus and a method of operating the desulfurization apparatus.

BACKGROUND

For example, in circulation cooling towers in large-scale air-conditioning facilities, condensation by evaporation of circulating water induces corrosion of metal parts in contact with cooling water, algae, and scale deposition. The condensed water therefore needs to be partially discarded, and the water to be discarded is separately treated and discharged. One of the proposed techniques for treating the condensed boiler cooling tower blowdown water is treating boiler cooling tower blowdown water with filters and reverse osmosis membranes (RO membranes) and supplying the treated water to the cooling tower again (Patent Literature 1).

CITATION LIST

Patent Literature

Patent Literature 1: Japanese Unexamined Patent Application Publication No. 02-95493

SUMMARY

Technical Problem

For example, absorbers through which absorbent circulates in wet-type desulfurization apparatuses for removing sulfur dioxides in plant flue gases in air pollution control systems in thermal power plants also need to be supplied with industrial water obtained by primary treatment of water derived from outside rivers, lakes, and marshes as makeup water. There is a demand for reducing the amount of industrial water intake necessary for the desulfurization apparatus.

The water treatment process in Patent Literature 1 may be employed to generate makeup water for the desulfurization apparatus from boiler cooling tower blowdown water. However, this process increases the power costs for operating the reverse osmosis device. Moreover, the reverse osmosis membrane (RO membrane) requires periodical chemical cleaning for avoiding its clogging, and the pre-treatment system for the reverse osmosis membrane is complicated, leading to cost increase.

In producing makeup water for the desulfurization apparatus by treating the boiler cooling tower blowdown water, the processing ability of the reverse osmosis device is excessive as the treated water is equivalent to the pure water level. Meanwhile, the boiler cooling tower blowdown water in the same site is not treated or undergoes minimum pollutant removal or pH adjustment before being discharged to rivers. Based on these, reuse of boiler cooling tower blowdown water by a simple treatment system has been demanded. However, if the boiler cooling tower blowdown water is used as it is as makeup water for the desulfurization apparatus, organic chemicals included in the blowdown water cause serious oxidation inhibition in the absorbent and activity inhibition of calcium carbonate as a desulfurization absorber.

In view of the problem above, the present invention is aimed to provide a desulfurization apparatus and a method of operating a desulfurization apparatus for reusing boiler cooling tower blowdown water with a simple treatment system.

Solution to Problem

To solve the problem described above, a first invention of the present invention is a desulfurization apparatus that includes a blowdown water line for introducing boiler cooling tower blowdown water from a boiler cooling tower; an organic matter remover disposed on the blowdown water line to remove organic matter in the boiler cooling tower blowdown water by activated carbon; an absorber configured to absorb sulfur oxides in flue gas from a boiler; and a makeup water introducing line for introducing the boiler cooling tower blowdown water from which the organic matter has been removed as makeup water for the absorber.

According to the present invention, reusing the boiler cooling tower blowdown water can reduce the amount of water intake from rivers or industrial water for desulfurization apparatus makeup water. The simple treatment of the boiler cooling tower blowdown water is achieved by adsorption of organic matter by activated carbon or the like. This treatment requires lower power costs compared with the treatment process using a reverse osmosis device and does not require periodical chemical cleaning of the reverse osmosis membrane, thereby facilitating maintenance.

In a second invention according to the first invention of the desulfurization apparatus, a plurality of the organic matter removers are connected in series on the blowdown water line. Each of the organic matter removers includes an organic matter adsorption filter disposed on the blowdown water line to remove organic matter in the boiler cooling tower blowdown water; a main channel opening/closing valve disposed on an inlet side of the organic matter adsorption filter to open and close inflow of the boiler cooling tower blowdown water; a bypass line branching from the blowdown water line on an upstream side of the main channel opening/closing valve and bypassing the organic matter adsorption filter to connect to the blowdown water line on an outlet side of the organic matter adsorption filter; and a bypass opening/closing valve disposed on the bypass line to open and close inflow of the bypassed boiler cooling tower blowdown water.

According to the present invention, a plurality of organic matter adsorption filters are arranged in series, and a bypass line is provided to bypass a certain filter. When the adsorption capacity decreases, the channel is switched to bypass the filter with reduced adsorption capacity and pass through a standby filter. This configuration keeps the adsorption capacity for a long time and prolongs the continuous operating time.

A third invention according to the second invention of the desulfurization apparatus includes a controller configured to control opening and closing of the main channel opening/closing valve and the bypass opening/closing valve. The controller switches opening and closing of the main channel opening/closing valve and the bypass opening/closing valve in accordance with an operating time of the organic matter adsorption filter so that the bypass line bypasses the boiler cooling tower blowdown water to a downstream organic matter filter.

According to the present invention, the organic matter adsorption filters are used in rotation in accordance with the operating time and the recycle maintenance history or replacement history of the organic matter adsorption filters. This configuration keeps the appropriate number of organic matter adsorption filters in operation and the state of organic matter adsorption filters.

A fourth invention according to the second invention of the desulfurization apparatus includes a measuring device disposed between the organic matter adsorption filter and the main channel opening/closing valve to measure property of boiler cooling tower blowdown treated water flowing into the organic matter adsorption filter; and a controller configured to control opening and closing of the main channel opening/closing valve and the bypass opening/closing valve based on the property of the boiler cooling tower blowdown treated water measured by the measuring device. The controller switches opening and closing of the main channel opening/closing valve and the bypass opening/closing valve based on the property of the boiler cooling tower blowdown treated water, and bypasses the boiler cooling tower blowdown water through the bypass line so that the boiler cooling tower blowdown water is bypassed to a downstream organic matter filter.

According to the present invention, a measuring instrument is installed for measuring the property of the boiler cooling tower blowdown treated water. Based on the measurement result of measurement data of the targeted organic matter adsorption filter, change in adsorption capacity of the target filter is grasped. When the adsorption capacity of the filter is equal to or smaller than a prescribed value, the controller opens/closes each valve to automatically switch the channel.

A fifth invention according to the second invention of the desulfurization apparatus includes measuring devices disposed in both front and back of the organic matter adsorption filter to measure a pressure difference of the organic matter adsorption filter; and a controller configured to control opening and closing of the main channel opening/closing valve and the bypass opening/closing valve based on a degree of filter clogging determined from the pressure difference measured by the measuring devices. The controller switches opening and closing of the main channel opening/closing valve and the bypass opening/closing valve based on the pressure difference, and bypasses the boiler cooling tower blowdown water through the bypass line so that the boiler cooling tower blowdown water is bypassed to a downstream organic matter filter.

According to the present invention, a measuring instrument is installed for measuring the state of pressure difference of the organic matter adsorption filter. Change in adsorption capacity of the filter is grasped based on the measurement result of measurement data. When the pressure difference of the filter is equal to or greater than a prescribed value, the controller opens/closes each valve to automatically switch the channel.

A sixth invention is a method of operating a desulfurization apparatus. The method includes, by using the desulfurization apparatus of any one of the second to fifth inventions, absorbing organic matter in the boiler cooling tower blowdown water with the organic matter adsorption filters disposed in series, the organic matter absorption filters including one or more standby organic matter adsorption filters, and the rest of the organic matter adsorption filters being used for the adsorbing; and when part of the organic matter adsorption filters is bypassed, absorbing organic matter in the boiler cooling tower blowdown water with the standby organic matter adsorption filter.

According to the present invention, in the case where a standby organic matter adsorption filter is disposed, if breakthrough of an organic matter adsorption filter occurs, the filter is switched to the standby organic matter adsorption filter to adsorb organic matter in the boiler cooling tower blowdown water, with the operating ability of the absorber being kept as it is.

A seventh invention is a method of operating a desulfurization apparatus. The method includes, by using the desulfurization apparatus of any one of the second to fifth inventions, absorbing organic matter in the boiler cooling tower blowdown water with all of the organic matter adsorption filters disposed in series; and when part of the organic matter adsorption filters is bypassed, performing desulfurization treatment with load of operating ability of the absorber reduced.

According to the present invention, in the case where a standby organic matter adsorption filter is not disposed, if breakthrough of an organic matter adsorption filter occurs, the load of operating ability of the absorber is reduced, and the breakthrough organic matter adsorption filter is bypassed. The remaining organic matter adsorption filters are used to adsorb organic matter in the boiler cooling tower blowdown water.

In an eighth invention according to the seventh invention of the desulfurization apparatus, the desulfurization apparatus includes an oxidation reduction potential meter configured to measure oxidation reduction potential in absorbent circulating in the absorber; and a controller configured to control opening and closing of the main channel opening/closing valve and the bypass opening/closing valve based on a value of oxidation reduction potential of the absorbent measured by the oxidation reduction potential meter. The method includes, when a value of oxidation reduction potential of the absorbent decreases, by the controller, switching opening and closing of the main channel opening/closing valve and the bypass opening/closing valve of a standby unused organic matter remover; stopping inflow of the boiler cooling tower blowdown water to the bypass line on standby; and allowing the boiler cooling tower blowdown water to flow into a standby organic matter filter so that organic matter in the boiler cooling tower blowdown water is removed.

According to the present invention, when the value of oxidation reduction potential in the absorber is not restored to a proper value, a standby organic matter adsorption filter is used to remove organic matter first, and more chemicals in the boiler cooling tower blowdown water are removed than those removed in the present state, thereby reducing inflow of organic matter into the absorber.

Advantageous Effects of Invention

According to the present invention, reusing the boiler cooling tower blowdown water can reduce the amount of water intake now derived from rivers or industrial water for makeup water for the desulfurization apparatus. The treatment by activated carbon requires lower power costs compared with the treatment process using a reverse osmosis device and does not require periodical chemical cleaning as in the reverse osmosis treatment, thereby facilitating maintenance.

BRIEF DESCRIPTION OF DRAWINGS

FIG. 3 is a diagram illustrating an example of the operation according to the second embodiment.

FIG. 6 is a diagram illustrating an example of the operation according to the third embodiment.

DESCRIPTION OF EMBODIMENTS

Preferred embodiments of the present invention will be described in detail below with reference to the accompanying drawings. It should be noted that the present invention is not limited by those embodiments. If there are a plurality of embodiments, a combination of embodiments is encompassed.

First Embodiment

Figure 1:
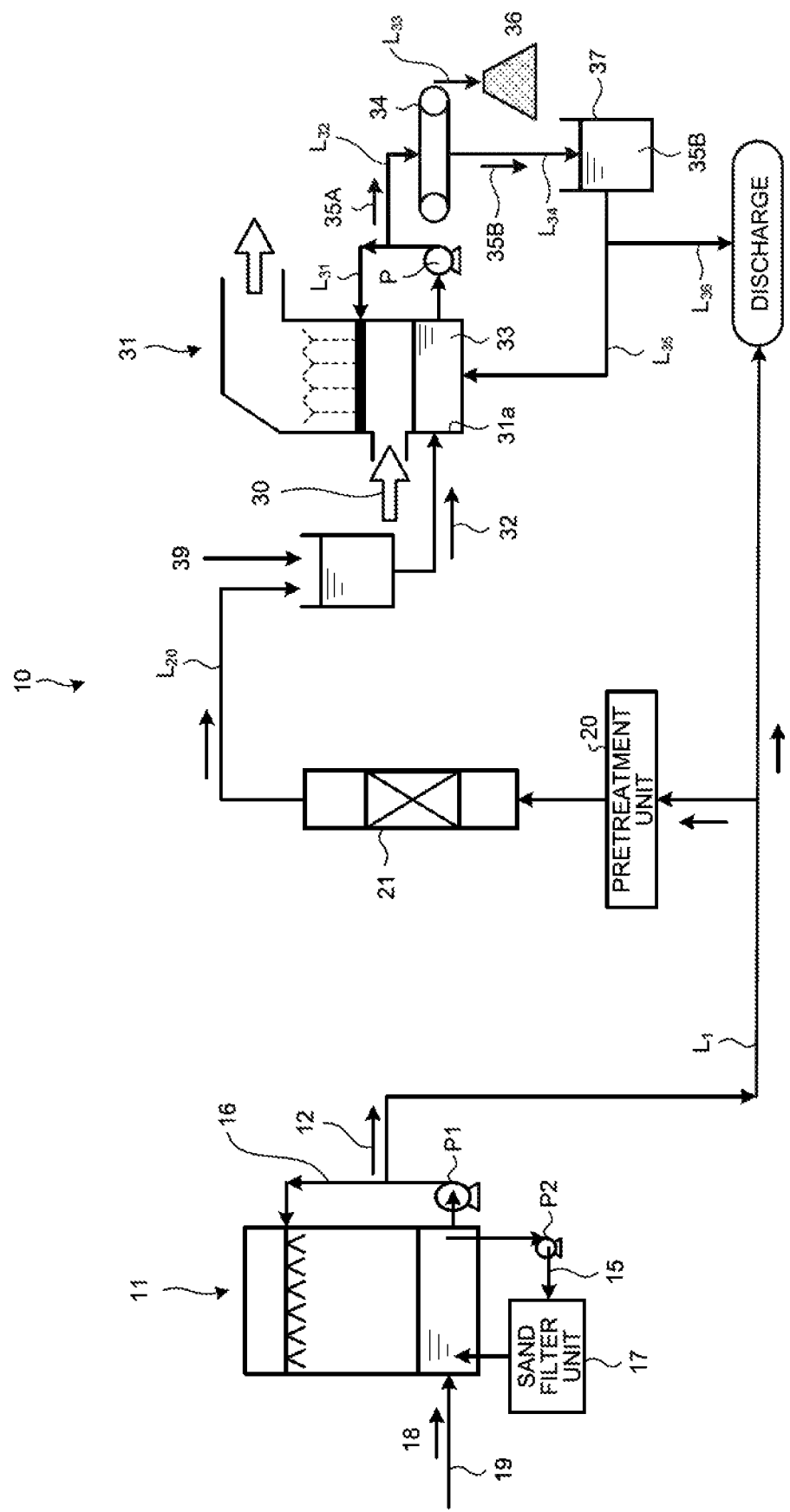
FIG. 1 is a schematic diagram of a desulfurization apparatus according to a first embodiment.

FIG. 1 is a schematic diagram of a desulfurization apparatus according to a first embodiment. As illustrated in FIG. 1, a desulfurization apparatus 10 according to the present embodiment includes a blowdown water line $L_1$ for introducing boiler cooling tower blowdown water 12 from a boiler cooling tower (hereinafter referred to as "cooling tower") 11, an organic matter remover 21 disposed on the blowdown water line $L_1$ to remove organic matter in the boiler cooling tower blowdown water 12 by activated carbon, an absorber 31 for absorbing sulfur oxides in flue gas 30 from a boiler (not illustrated) by an absorbent 33, and a makeup water introducing line $L_{20}$ connected to the organic matter remover 21 for introducing the boiler cooling tower blowdown water 12 from which the organic matter has been removed as makeup water 32 for the absorber 31. In FIG. 1, $L_{31}$ denotes a circulation line for the absorbent 33, P denotes a fluid feed pump disposed on the circulation line $L_{31}$ for feeding the absorbent 33, 34 denotes a solid-liquid separator for separating gypsum 36 from an absorbent (hereinafter referred to as "desulfurized effluent") 35A drawn off from an absorbent storage 31a in the absorber 31, 35B denotes an isolated fluid produced by separating the gypsum 36 from the desulfurized effluent 35A, $L_{32}$ denotes a line branching from a circulation line $L_{31}$ for drawing off the desulfurized effluent 35A, $L_{33}$ denotes a gypsum discharge line for discharging gypsum 36, 37 denotes a storage basin for storing the isolated fluid 35B, $L_{34}$ denotes an isolated fluid supply line for supplying the isolated fluid 35B to the storage basin 37, $L_{35}$ denotes an isolated fluid return line for returning the isolated fluid 35B from the storage basin 37 to the absorbent storage 31a, and $L_{36}$ denotes an isolated fluid discharge line for discharging the isolated fluid 35B from the storage basin 37.

In the present embodiment, the organic matter remover 21 is installed on the blowdown water line $L_1$ supplying the boiler cooling tower blowdown water 12 to the absorber 31 as makeup water 32 to remove, for example, organic matter such as scale preventive and rust preventive included in the boiler cooling tower blowdown water 12. The removal of organic matter included in the makeup water 32 enables desulfurization treatment without inhibition of oxidation and activity of absorbent in the desulfurization apparatus due to organic matter. Examples of the organic matter include organic chemicals such as polyphosphates, acrylic acid polymers, and organic phosphorous polymers.

In the present embodiment, a pretreatment unit 20 is installed upstream of the organic matter remover 21. The pretreatment unit 20 is preferably, for example, a relatively simple membrane filtering system such as a sand filtration system, a microfiltration system, an ultrafiltration system, and a nanofiltration system. The installation of the pretreatment unit 20 can prevent reduction in process flow rate load otherwise caused by adhesion of solids to the organic matter remover 21.

Examples of the organic matter remover 21 may include an ion exchange facility using ion exchange resin other than removing organic matter by activated carbon. The treatment by activated carbon requires lower power costs, compared with the treatment process using RO (reverse osmosis device). This treatment does not require periodical chemical cleaning of the reverse osmosis membrane, thereby facilitating maintenance. In the treatment by activated carbon compared with the treatment process using a reverse osmosis (RO) system, the power-costs are lower than in the operation using a reverse osmosis system, and the plant operation in the desulfurization apparatus is economical. The reverse osmosis device requires periodical chemical cleaning of the reverse osmosis membrane, whereas the treatment using activated carbon does not require this periodical cleaning, thereby facilitating maintenance of the desulfurization apparatus.

The boiler cooling tower blowdown water 12 from the cooling tower 11 is taken by the required amount from the cooling tower 11, and the rest is discharged as effluent. The cooling tower 11 includes a circulation line 16 for circulating cooling water through a pump $P_1$, a clarifying line 15 for drawing off cooling water through a pump $P_2$ and having a sand filter unit 17 disposed thereon, and an introducing line 19 for introducing cooling tower makeup water 18 to the cooling tower 11.

In the desulfurization apparatus 10 according to the present embodiment, configurations of the cooling tower 11 and the absorber 31 are not particularly limited as long as they are known configurations.

Reusing the boiler cooling tower blowdown water 12 can reduce the amount of water intake as river water (or industrial water) 39 for desulfurization apparatus makeup water. In the present first embodiment, the organic matter remover 21 removes organic matter in the boiler cooling tower blowdown water 12 from the cooling tower 11 using activated carbon or the like to prevent oxidation inhibition and activity inhibition in the absorber 31 in the desulfurization apparatus. As being used as makeup water 32 for the absorber 31, the boiler cooling tower blowdown water 12 is less discharged to the outside.

Second Embodiment

Figure 2:
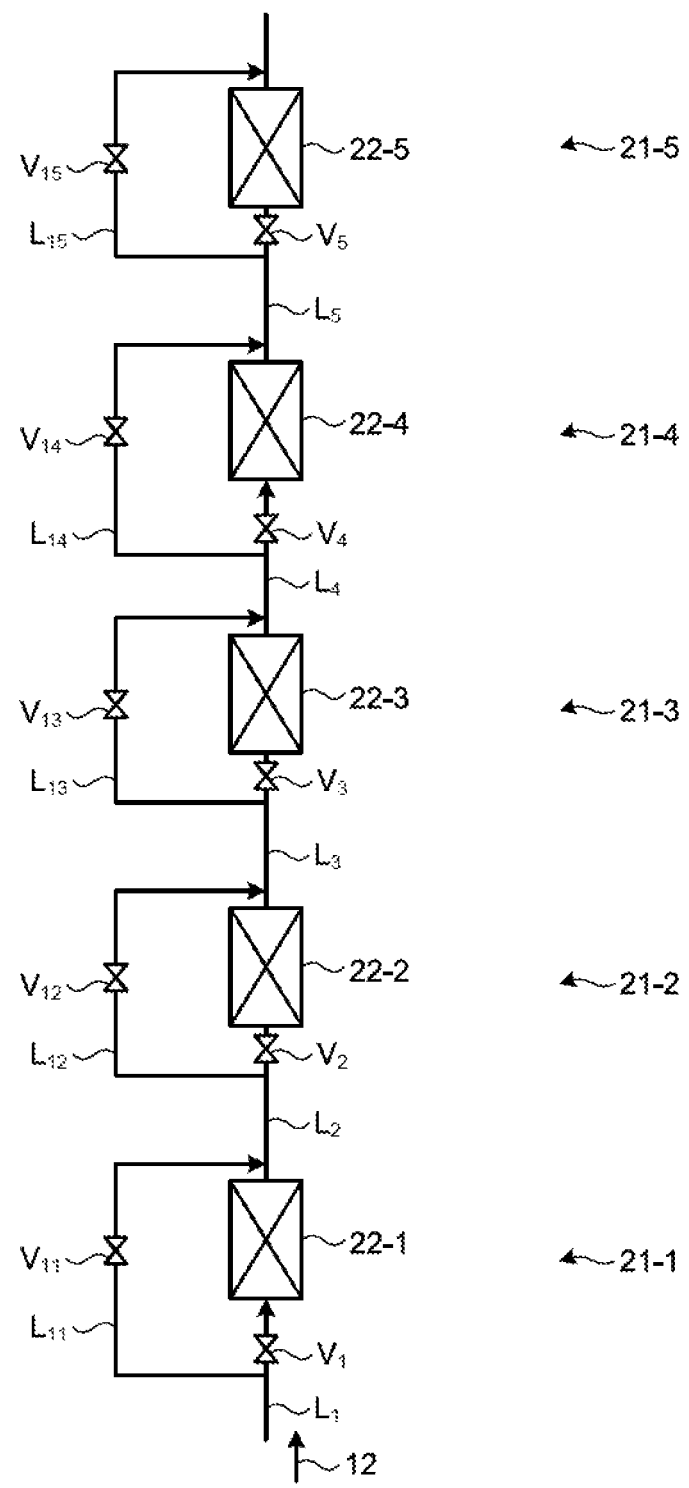
FIG. 2 is a schematic diagram illustrating an organic matter remover in the desulfurization apparatus according to a second embodiment.

A desulfurization apparatus according to a second embodiment of the present invention will be described with reference to the figure. FIG. 2 is a schematic diagram illustrating the organic matter remover in the desulfurization apparatus according to the second embodiment. As illustrated in FIG. 2, the organic matter remover according to the present embodiment includes a plurality of (in the present embodiment, five) organic matter removers, that is, first to fifth organic matter removers (21-1, 21-2, 21-3, 21-4, 21-5) connected in series. Since the first organic matter remover 21-1 to the fifth organic matter remover 21-5 have the same configuration, the first organic matter remover 21-1 is described by way of example. The first organic matter remover 21-1 includes a first organic matter adsorption filter 22-1 disposed on the blowdown water line $L_1$ for removing organic matter in the boiler cooling tower blowdown water 12, a first main channel opening/closing valve $V_1$ provided on the inlet side of the first organic matter adsorption filter 22-1 for opening/closing the inflow of the boiler cooling tower blowdown water 12, a first bypass line $L_{11}$ branching from the first blowdown water line $L_1$ on the upstream side of the first main channel opening/closing valve $V_1$ and bypassing the first organic matter adsorption filter 22-1 to connect to the second blowdown water line $L_2$ on the outlet side of the first organic matter adsorption filter 22-1, and a bypass opening/closing valve $V_{11}$ disposed on the first bypass line $L_{11}$ for opening/closing the inflow of the bypassed boiler cooling tower blowdown water 12.

In the present embodiment, five such removers, namely, the first organic matter remover 21-1 to the fifth organic matter remover 21-5 are arranged in series, the first to fifth organic matter adsorption filters (referred to as "first to fifth filters") 22-1 to 22-5 are connected in series to the blowdown water line, the first to fifth organic matter adsorption filters 22-1 are provided with the first to fifth bypass lines $L_{11}$ to $L_{15}$, respectively, to form a channel that bypasses the first to fifth organic matter adsorption filters 22-1 to 21-5.

In the present embodiment, for example, in the case where five organic matter adsorption filters are installed, in the initial operation, the channel passes through the first filter 22-1, the second filter 22-2, and the third filter 22-3 in series, whereas the fourth filter 22-4 and the fifth filter 22-5 are bypassed using the fourth bypass line $L_{14}$ and the fourth bypass line $L_{15}$ to serve as standbys.

When the adsorption capacity of the first filter 22-1 decreases, the channel of the fourth filter 22-4 is switched from the bypass line $L_{14}$ to the channel passing through the fourth filter 22-4, while the valve $V_1$ of the first filter is closed so that the first filter 22-1 is bypassed.

A new organic matter adsorption filter may be placed in the deteriorated, bypassed first filter 22-1. Alternatively, when activated carbon is used as an organic matter adsorption filter, recycling and reusing the filter can keep its adsorption capacity for a long time and increase the continuous operating time.

The present embodiment can prolong the continuous operating time and reduce the frequency of periodical maintenance.

The series arrangement of filters can reduce the load per organic matter adsorption filter and can cope with the boiler cooling tower blowdown water 12 including a high concentration of organic matter. In the case where highly concentrated boiler cooling tower blowdown water 12 is treated with a single organic matter adsorption filter, if breakthrough of the organic matter adsorption filter occurs, the organic matter adsorption filter as a whole needs to be replaced. The replacement of the filter involves stopping the organic matter removing process and thus increases the amount of river water intake. By contrast, with the distributed process in the series arrangement of a plurality of organic matter removers 21, the degree of organic matter adsorption filter breakthrough is dispersed.

The organic matter adsorption filters are installed, for example, as follows.

1) The amount of makeup as makeup water 32 for the absorber 31 in the boiler cooling tower blowdown water 12 to be treated is determined, and the amount of organic matter contained in boiler cooling tower blowdown water 12 is determined according to the volume of the amount of makeup. The amount of activated carbon necessary for adsorbing the determined amount of organic matter is obtained by calculation.

2) This calculation determines the amount of activated carbon per organic matter adsorption filter in the series arrangement. For example, in a case where five organic matter adsorption filters in the series arrangement are necessary, one or more standby filters are arranged in the series arrangement. In the present embodiment, two standby filters, namely, the fourth filter 22-4 and the fifth filter 22-5 are arranged.

3) The standby filters are initially not used and are bypassed by the fourth bypass line $L_{14}$ and the fifth bypass line $L_{15}$.

According to the present embodiment, in the case where a standby organic matter adsorption filter is arranged, if breakthrough of an organic matter adsorption filter occurs, the filter is switched to the standby organic matter adsorption filter to adsorb organic matter in the boiler cooling tower blowdown water, with the operating ability of the absorber 31 being kept as it is.

At least one organic matter adsorption filter is used as a standby filter. However, two or more organic matter adsorption filters may be arranged as standby filters.

By contrast, in a plurality of organic matter adsorption filters 22 arranged in series, when all the first to fifth filters 22-1 to 22-5 are used to adsorb organic matter in the boiler cooling tower blowdown water 12, bypassing some of the organic matter adsorption filters 22 can reduce the load of operating ability of the absorber 31 for desulfurization treatment. Reducing the load of operating ability of the absorber 31 can temporarily reduce the amount of supply of makeup water 32 and compensate for the reduction in adsorption treatment owing to the bypass. For example, in the case of a series process using five filters, namely, first to fifth filters 22-1 to 22-5 in series, for example, when the adsorption capacity of the first filter 22-1 decreases, the increase in load of adsorption treatment can be avoided by reducing the operating load in the absorber 31, reducing the amount of supply of makeup water 32, and operating the remaining four filters, namely, the second to fifth filters 22-2 to 22-5.

In this way, in the case where no standby organic matter adsorption filter is arranged, if breakthrough of an organic matter adsorption filter occurs, the load of operating ability of the absorber is reduced, the breakthrough organic matter adsorption filter is bypassed, and the remaining organic matter adsorption filters are used to adsorb organic matter in the boiler cooling tower blowdown water.

A description will be given of an example of the operation in the case where a plurality of (in the present embodiment, five) such organic matter adsorption filters are arranged in series and a channel is provided to bypass each organic matter adsorption filter. FIG. 3 is a diagram illustrating an example of the operation according to the second embodiment.

When three filters, namely, the first to third filters 22-1 to 22-3 operate in series, the arrangement for bypass operation is changed in accordance with the operating time of each filter. As illustrated in FIG. 3, for example, initially, three filters, namely, the first filter 22-1, the second filter 22-2, and the third filter 22-3 operate in series, and the fourth filter 22-4 and the fifth filter 22-5 are standbys and bypassed.

As illustrated in the left side in FIG. 3, in the initial operation, three filters, namely, the first filter 22-1, the second filter 22-2, and the third filter 22-3 operate in series. After a predetermined period of time, as illustrated in the right side in FIG. 3, the operation switches from bypassing the fourth filter 22-4 to passing through the filter. Subsequently, $V_1$ is closed so that the first bypass line $L_{11}$ for the first filter 22-1 is operated. The operation then switches from bypassing the fifth filter 22-5 to passing through the filter in accordance with the subsequent elapsed time. Subsequently, $V_2$ is closed so that the second bypass line $L_{12}$ for the second filter 22-2 is operated.

With such feedforward (FF) control in which the arrangement of bypass operation is changed in accordance with the plant operating time, organic matter in the boiler cooling tower blowdown water 12 to be introduced to the absorber 31 as makeup water 32 can be stably removed.

In the embodiment described above, five organic matter adsorption filters are provided in series. However, in the present invention, the number of organic matter adsorption filters installed may not be five and can be increased or decreased as appropriate depending on the boiler cooling tower blowdown water to be treated and the facilities in the plant.

Third Embodiment

Figure 4:
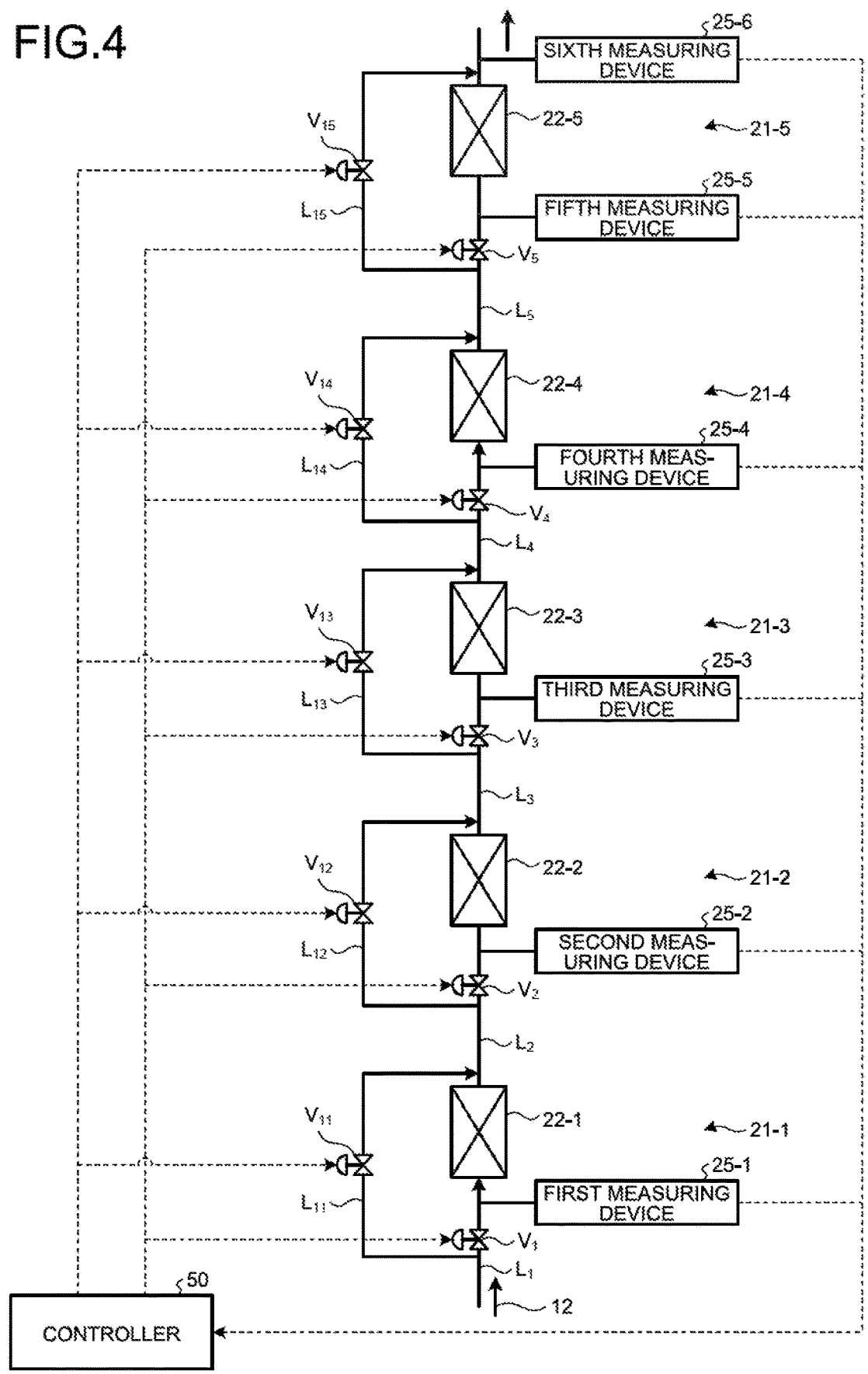
FIG. 4 is an exemplary schematic diagram illustrating an organic matter remover in the desulfurization apparatus according to a third embodiment.

A desulfurization apparatus according to a third embodiment of the present invention will foe described with reference to the figure. FIG. 4 is an exemplary schematic diagram illustrating the organic matter remover in the desulfurization apparatus according to the third embodiment. The members overlapping the components in the second embodiment are denoted by the same reference signs and will not be further elaborated. As illustrated in FIG. 4, the organic matter remover according to the present embodiment includes first organic matter adsorption filters 22-1 to 22-5, first to sixth measuring devices 25-1 to 25-6 provided between first to fifth main channel opening/closing valves $V_1$ to $V_5$ for measuring the property of the boiler cooling tower blowdown water 12 flowing into the first to fifth organic matter adsorption filters 22-1 to 22-5, and a controller 50 for controlling opening/closing of the first to fifth main channel opening/closing valves $V_1$ to $V_5$ and the first to fifth bypass opening/closing valves $V_{11}$ to $V_{12}$ based on the property of the boiler cooling tower blowdown water 12 measured by the first to sixth measuring devices 25-1 to 25-6. The controller 50 switches opening/closing of the first to fifth main channel opening/closing valves $V_1$ to $V_5$ and the first to fifth bypass opening/closing valves $V_{11}$ to $V_{15}$ based on the property of the boiler cooling tower blowdown water 12 (for example, a prescribed value preset when the upper limit of the adsorption capacity is reached), bypasses the boiler cooling tower blowdown water 12 through the first to fifth bypass lines $L_{11}$ to $L_{15}$, and bypasses the boiler cooling tower blowdown water 12 to the downstream organic matter filters.

The measuring devices 25 are installed in both front and back of each filter to grasp a change in adsorption capacity of the filter based on measurement data of the measuring device 25. If the controller 50 determines that the preset adsorption capacity of the filter is equal to or smaller than a prescribed value based on the result of the measuring device, the controller 50 opens/closes the valves $V_1$ and $V_{11}$ to switch the channel.

Examples of the measuring device used here are total organic carbon (TOC) analyzer and chemical oxygen demand (COD) analyzer for measuring the property of the boiler cooling tower blowdown water 12. The bypass line is switched based on the property of the boiler cooling tower blowdown water 12 (for example, preset TOC value or COD value when the upper limit of adsorption capacity is reached). With the TOC analyzer or the COD analyzer, the adsorption capacity can be determined from the organic matter concentration at the outlet of the organic matter adsorption filter.

When a pressure gauge is used as the measuring device, the degree of clogging can be grasped from the pressure difference before and after each organic matter adsorption filter.

Switching the channel in the first embodiment can be performed automatically under the control by the controller 50 based on the measurement result using the measuring device 25.

In a modification of the third embodiment, when the value of TOC or COD at the outlet of each organic matter adsorption filter exceeds a prescribed value in each measuring instrument and the adsorption capacity of the organic matter adsorption filter reaches the permissible upper limit value, or when the pressure difference of each organic matter adsorption filter exceeds a prescribed value and reaches the permissible upper limit of the degree of clogging, feedback (FB) control may be performed such that organic matter adsorption filters not deteriorated are combined. The TOC or COD analyzer at the outlet of each filter may be installed at the outlet of each individual filter for operation management, as illustrated in the example in FIG. 4. Alternatively, sampling valves may be provided at the outlets of the organic matter adsorption filters and individually switched such that the fluid is fed to a representative analyzer and analyzed, and the state of each organic matter adsorption filter may be managed by an operation management device.

The organic matter adsorption filter reduced in adsorption capacity is bypassed and isolated from the operating system to be subjected to maintenance such as backwash and recycle.

If it is determined that the filter is unable to be backwashed or recycled and reaches its service life, the activated carbon filter is replaced. The replacement filter may be a cartridge type that is replaceable with its housing, and the activated carbon in the cartridge may be replaced, which facilitates maintenance. Alternatively, a tray may be installed in the tower, and the activated carbon may be pulled out of the tray and replaced.

The series arrangement can reduce the load per organic matter adsorption filter and can cope with highly concentrated waste fluid.

The organic matter adsorption filter reduced in adsorption capacity is specified using the measuring device, and the deteriorated organic matter adsorption filter is eliminated from the channel. This enables maintenance without stopping the operation.

Alternatively, pressure gauges are provided as measuring devices 25 in both front and back of the organic matter adsorption filters 22 to measure the pressure differences of the organic matter adsorption filters 22-1 to 22-5. The controller 50 controls the opening/closing of the main channel opening/closing valve $V_1$ and the bypass opening/closing valve $V_{11}$ based on the degree of clogging of the filter determined from the pressure differences measured by the measuring device 25. The controller 50, based on the pressure differences, switches the opening/closing of the main channel opening/closing valve $V_1$ and the bypass opening/closing valve $V_{11}$ to bypass the boiler cooling tower blowdown water through the bypass line $L_{11}$ and bypass the boiler cooling tower blowdown water 12 to the downstream organic matter filter.

Fourth Embodiment

Figure 5:
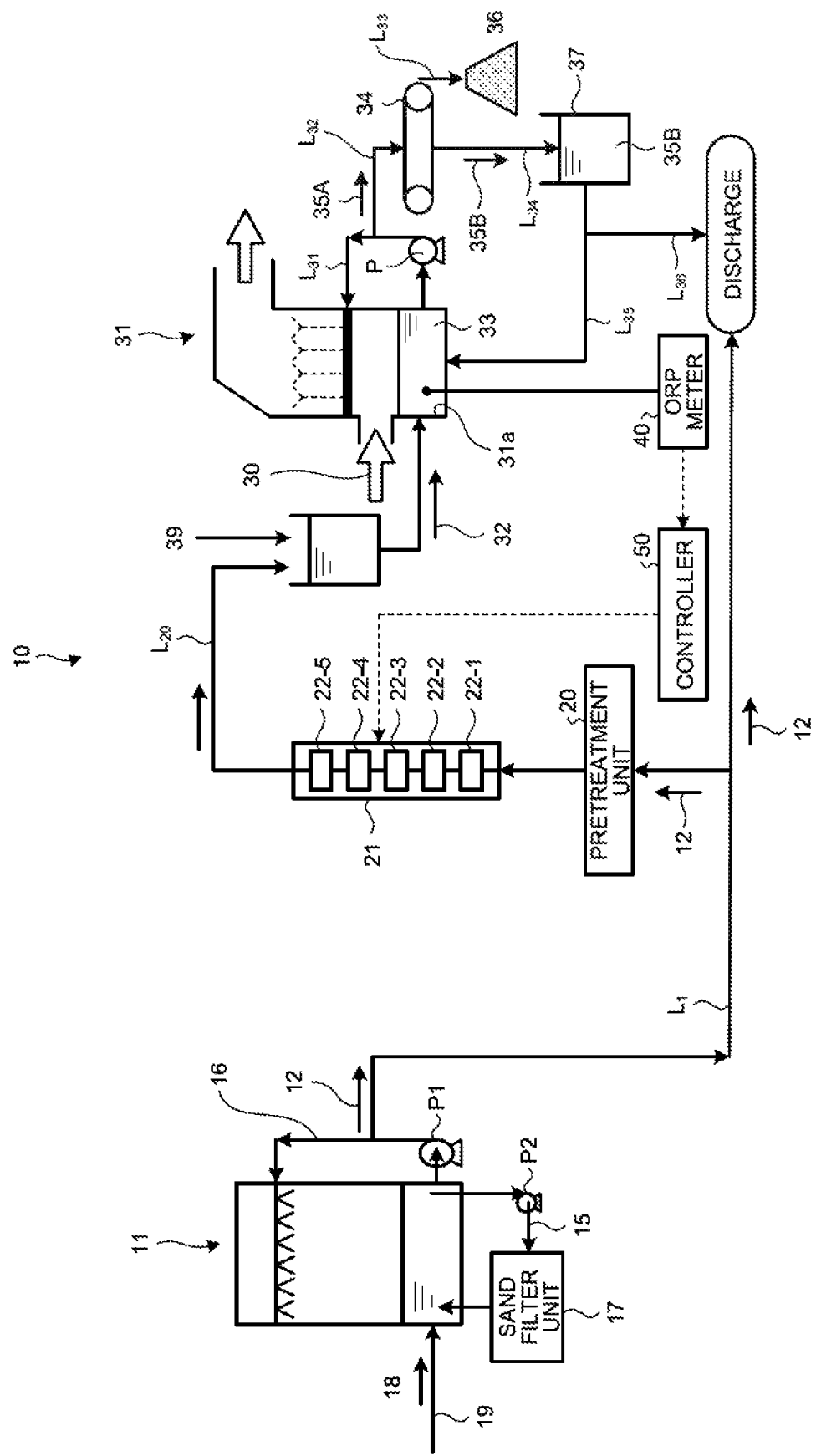
FIG. 5 is a schematic diagram illustrating a desulfurization system according to a fourth embodiment.

A desulfurization apparatus according to a fourth embodiment of the present invention will be described with reference to the figure. FIG. 5 is a schematic diagram illustrating a desulfurization system according to the fourth embodiment. As illustrated in FIG. 5, the desulfurization system according to the present embodiment includes an oxidation reduction potential (ORP) meter 40 for measuring the oxidation reduction potential in the absorbent 33 circulating in the absorber 31 and a controller 50 for controlling the opening/closing of the main channel opening/closing valve and the bypass opening/closing valve based on the value of ORP of the absorbent measured by the oxidation reduction potential meter 40. As illustrated in FIG. 4, when the value of ORP of the absorbent 33 circulating in the absorber 31 decreases, the controller 50 switches the opening and closing of the main channel opening/closing valve $V_4$ and the bypass opening/closing valve $V_{14}$ of the standby unused fourth organic matter remover 21-4, stops the inflow of the boiler cooling tower blowdown water 12 into the standby bypass line $L_{14}$, and allows the boiler cooling tower blowdown water 12 to flow into the standby fourth organic matter filter 22-4 to remove organic matter in the boiler cooling tower blowdown water 12.

When the measuring devices 25 are not provided, the filters operate for a predetermined time in rotation. In this case, however, when the concentration of organic matter in the boiler cooling tower blowdown water 12 is higher than usual, breakthrough of the organic matter adsorption filter occurs before being operated for a predetermined time. In such a case, the organic matter concentration in the absorber 31 increases to inhibit, desulfurization. When the ORP value decreases and the oxidation inhibition in desulfurization treatment increases, the capability of the organic matter adsorption filter is increased.

When the measuring devices 25 are installed, organic matter adsorption filters with a lower measurement value are combined to remove organic matter.

As an example of normal ORP with no oxidation inhibition, the ORP value is from 80 mV to 100 mV or higher. By contrast, as an example of ORP with lower oxidation performance, the ORP value is 80 mV or lower.

Chemicals (for example, acrylic acid) introduced into the absorber 31 without being removed by the organic matter adsorption filter may reduce the oxidation rate in the absorbent 33 and cause oxidation inhibition in the absorber 31.

The oxidation inhibition in the absorber 31 means as follows. In the case of a wet-type desulfurization apparatus using limestone as an absorbent, the absorbent (limestone: calcium carbonate) 33 reacts with SOx in flue gas 30 to absorb SOx to produce calcium sulfite (solid, scale trouble). If the ORP value decreases (100 mV or lower), the required amount of oxygen in the absorbent 33 decreases to lead to insufficient oxidation. As a result, the calcium sulfite remains as it is and is not oxidized to calcium sulfate (gypsum).

In a system including an ORP controller in the absorber 31, when the ORP value is equal to or lower than a proper value, air (oxygen) is supplied so as to increase air for oxidation in the absorbent 33, thereby increasing the amount of oxygen supply. The ORP controller may be implemented by, for example, increasing the amount of supply air or increasing the number of jet air spargers.

FIG. 6 is a diagram illustrating an example of the operation according to the third embodiment. If the normal ORP control does not restore the value of ORP in the absorber 31 to a proper value (100 mV or higher), the amount of chemicals in the boiler cooling tower blowdown water 12 is excessive more than expected. In such a case, as illustrated in the right side in FIG. 6, a standby organic matter adsorption filter is used to remove the organic matter first, so that more chemicals in the boiler cooling tower blowdown water 12 are removed than those removed in the present state, thereby reducing the inflow of organic matter into the absorber.

Fifth Embodiment

Figure 7:
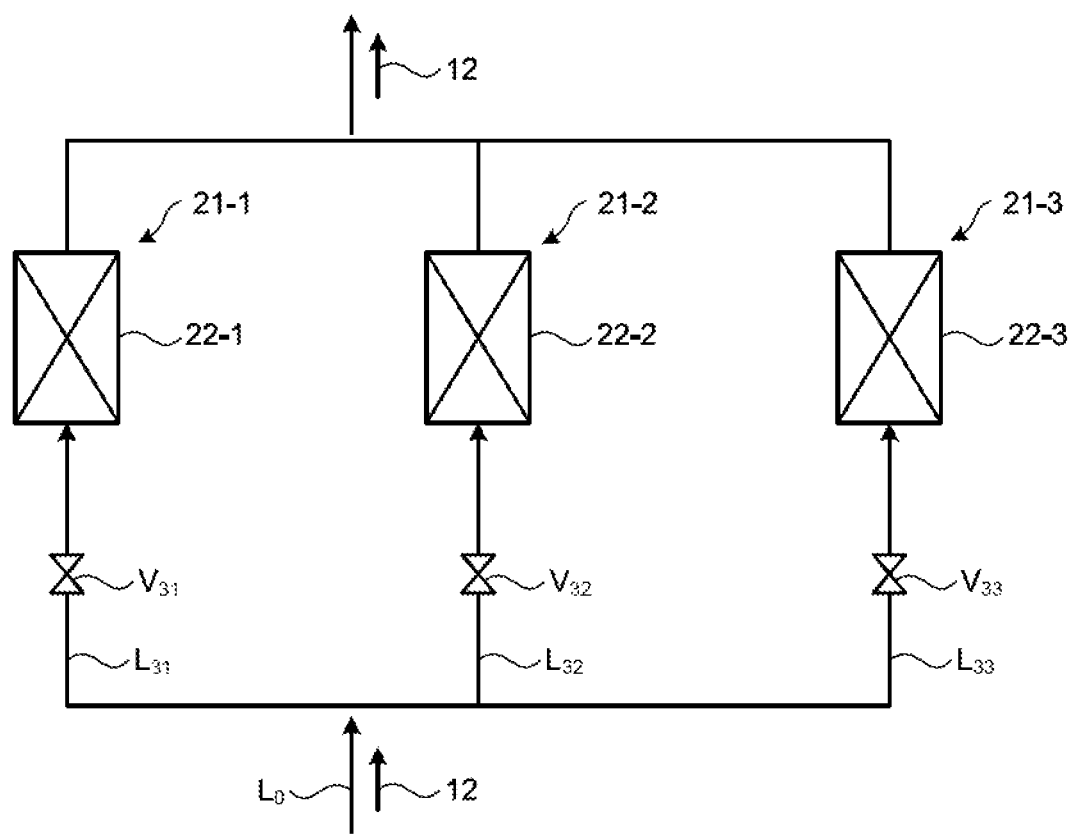
FIG. 7 is a schematic diagram illustrating a desulfurization system according to a fifth embodiment.
Figure 8:
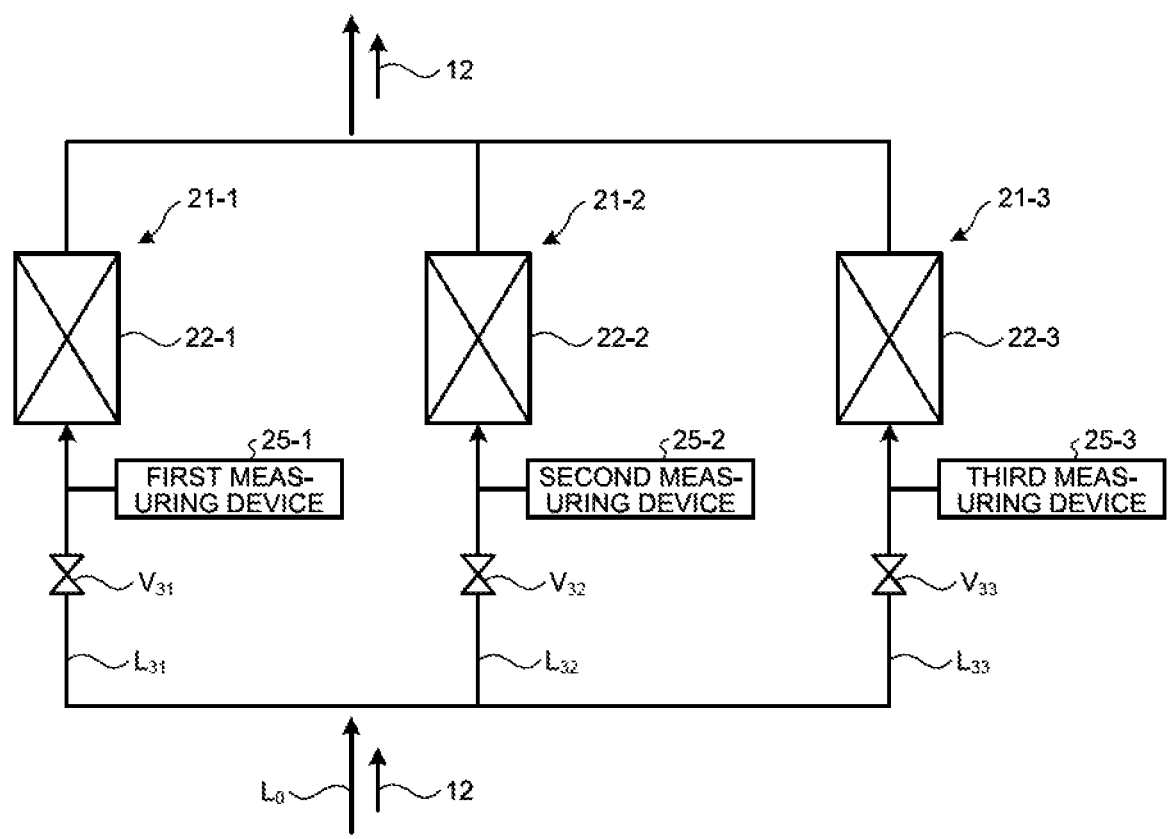
FIG. 8 is a schematic diagram illustrating the desulfurization system according to the fifth embodiment.

A desulfurization apparatus according to a fifth embodiment of the present invention will be described with reference to the figures. FIG. 7 and FIG. 8 are schematic diagrams illustrating a desulfurization system according to the fifth embodiment. As illustrated in FIG. 7, the desulfurization apparatus according to the present embodiment includes a plurality of (in the present embodiment, three) organic matter removers 21-1, 21-2, and 21-3 connected in parallel, first to third organic matter adsorption filters 22-1 to 22-3 respectively disposed on a plurality of introducing lines $L_{31}$, $L_{32}$, and $L_{33}$ in parallel, branching from a blowdown water line $L_0$ for removing organic matter in the boiler cooling tower blowdown water 12, and first to third channel-opening/closing valves $V_{31}$ to $V_{33}$ provided on the inlet side of the first to third organic matter adsorption filters 22-1 to 22-3 for opening/closing the inflow of the boiler cooling tower blowdown water 12.

In the desulfurization apparatus with a plurality of organic matter adsorption filters 22 arranged in parallel, one or more organic matter adsorption filters (in the present embodiment, third organic matter adsorption filter 22-3) are always standby, and the remaining first and second organic matter adsorption filters 22-1 and 22-2 are used to adsorb organic matter in the boiler cooling tower blowdown water 12 in parallel. When the first organic matter adsorption filter 22-1 is stopped, the standby third organic matter adsorption filter 22-3 is used to adsorb organic matter in the boiler cooling tower blowdown water 12. This enables removal of organic matter in the boiler cooling tower blowdown water without stopping operation.

By contrast, in the case where the organic matter adsorption filters are arranged in parallel and ail the first to third organic matter adsorption filters 22-1 to 22-3 are used to adsorb organic matter in the boiler cooling tower blowdown water 12, the load of operating ability of the absorber 31 may be reduced in desulfurization treatment when some of the organic matter adsorption filters 22 in use are stopped. Since the load of operating ability of the absorber 31 is reduced, the amount of supply of makeup water 32 is temporarily reduced to compensate for the reduction in adsorption treatment caused by the stopping. For example, in the case where three filters 22-1 to 22-3 are used in parallel, for example, if the adsorption capacity of the first filter 22-1 decreases, increase in load of adsorption treatment can be avoided by reducing the operation load in the absorber 31, reducing the amount of supply of makeup water 32, and operating the remaining two second and third filters 22-2 and 22-3.

As illustrated in FIG. 8, first to third measuring devices 25-1 to 25-3 may be provided between the first to third organic matter adsorption filters 22-1 to 22-3 and the first to third channel-opening/closing valves $V_{31}$ to $V_{33}$ for measuring the property of the boiler cooling tower blowdown water 12 flowing into the first to third organic matter adsorption filters 22-1 to 22-3, in the same manner as in the second embodiment. The first to third measuring devices 25-1 to 25-3 may be used to monitor deterioration of the organic matter adsorption filters, grasp change in adsorption capacity of the filters, and replace the filters. The measuring devices are used to specify a filter with reduced adsorption capacity and eliminate the deteriorated filter from the channel, thereby enabling maintenance without stopping operation.

REFERENCE SIGNS LIST

10 Desulfurization apparatus
11 Boiler cooling tower
12 Boiler cooling tower blowdown water
$L_1$ Blowdown water line
21 Organic matter remover
31 Absorber
32 Makeup water
$L_{20}$ Makeup water introducing line

The invention claimed is:

1. A desulfurization apparatus comprising:
a blowdown water line for introducing boiler cooling tower blowdown water discharged from a cooling tower for a boiler;
an organic matter remover disposed on the blowdown water line to remove organic matter in the boiler cooling tower blowdown water by activated carbon;
an absorber configured to absorb sulfur oxides in flue gas from the boiler; and
a makeup water introducing line for introducing the boiler cooling tower blowdown water from which the organic matter has been removed as makeup water for the absorber.

2. The desulfurization apparatus according to claim 1, wherein
a plurality of the organic matter removers are connected in series on the blowdown water line, and
each of the organic matter removers includes
an organic matter adsorption filter disposed on the blowdown water line to remove organic matter in the boiler cooling tower blowdown water;
a main channel opening/closing valve disposed on an inlet side of the organic matter adsorption filter to open and close inflow of the boiler cooling tower blowdown water;
a bypass line branching from the blowdown water line on an upstream side of the main channel opening/closing valve and bypassing the organic matter adsorption filter to connect to the blowdown water line on an outlet side of the organic matter adsorption filter; and
a bypass opening/closing valve disposed on the bypass line to open and close inflow of the bypassed boiler cooling tower blowdown water.

3. The desulfurization apparatus according to claim 2, further comprising a controller configured to control opening and closing of the main channel opening/closing valve and the bypass opening/closing valve, wherein
the controller switches opening and closing of the main channel opening/closing valve and the bypass opening/closing valve in accordance with an operating time of the organic matter adsorption filter so that the bypass line bypasses the boiler cooling tower blowdown water to a downstream organic matter filter.

4. The desulfurization apparatus according to claim 2, further comprising:
a measuring device disposed between the organic matter adsorption filter and the main channel opening/closing valve to measure property of boiler cooling tower blowdown treated water flowing into the organic matter adsorption filter; and
a controller configured to control opening and closing of the main channel opening/closing valve and the bypass opening/closing valve based on the property of the boiler cooling tower blowdown treated water measured by the measuring device, wherein
the controller switches opening and closing of the main channel opening/closing valve and the bypass opening/closing valve based on the property of the boiler cooling tower blowdown treated water, and bypasses the boiler cooling tower blowdown water through the bypass line so that the boiler cooling tower blowdown water is bypassed to a downstream organic matter filter.

5. The desulfurization apparatus according to claim 2, further comprising:
measuring devices disposed in both front and back of the organic matter adsorption filter to measure a pressure difference of the organic matter adsorption filter; and
a controller configured to control opening and closing of the main channel opening/closing valve and the bypass opening/closing valve based on a degree of filter clogging determined from the pressure difference measured by the measuring devices, wherein
the controller switches opening and closing of the main channel opening/closing valve and the bypass opening/closing valve based on the pressure difference, and bypasses the boiler cooling tower blowdown water through the bypass line so that the boiler cooling tower blowdown water is bypassed to a downstream organic matter filter.

6. A method of operating a desulfurization apparatus, the method comprising:
by using the desulfurization apparatus according to claim 2,
absorbing organic matter in the boiler cooling tower blowdown water with the organic matter adsorption filters disposed in series, the organic matter absorption filters including one or more standby organic matter adsorption filters, and the rest of the organic matter adsorption filters being used for the adsorbing; and
when part of the organic matter adsorption filters is bypassed, absorbing organic matter in the boiler cooling tower blowdown water with the standby organic matter adsorption filter.

7. A method of operating a desulfurization apparatus, the method comprising:
by using the desulfurization apparatus according to claim 2,
adsorbing organic matter in the boiler cooling tower blowdown water with all of the organic matter adsorption filters disposed in series; and
when part of the organic matter adsorption filters is bypassed, performing desulfurization treatment with load of operating ability of the absorber reduced.

8. The method of operating a desulfurization apparatus according to claim 7, wherein the desulfurization apparatus comprises
- an oxidation reduction potential meter configured to measure oxidation reduction potential in absorbent circulating in the absorber; and
- a controller configured to control opening and closing of the main channel opening/closing valve and the bypass opening/closing valve based on a value of oxidation reduction potential of the absorbent measured by the oxidation reduction potential meter, and the method comprises:
- when a value of oxidation reduction potential of the absorbent decreases, by the controller,
- switching opening and closing of the main channel opening/closing valve and the bypass opening/closing valve of a standby unused organic matter remover;
- stopping inflow of the boiler cooling tower blowdown water to the bypass line on standby; and
- allowing the boiler cooling tower blowdown water to flow into a standby organic matter filter so that organic matter in the boiler cooling tower blowdown water is removed.

\* \* \* \* \*